United States Patent
Kolman et al.

(10) Patent No.: US 9,325,733 B1
(45) Date of Patent: Apr. 26, 2016

(54) UNSUPERVISED AGGREGATION OF SECURITY RULES

(71) Applicant: EMC Corporation, Hopkinton, MA (US)

(72) Inventors: Eyal Kolman, Tel Aviv (IL); Eyal Yehowa Gruss, Kiryat Ono (IL); Alon Kaufman, Bnei Dror (IL); Ereli Eran, Tel Aviv (IL)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 14/530,061

(22) Filed: Oct. 31, 2014

(51) Int. Cl.
*H04L 29/00* (2006.01)
*H04L 29/06* (2006.01)

(52) U.S. Cl.
CPC ........ *H04L 63/1441* (2013.01); *H04L 63/0227* (2013.01); *H04L 63/0263* (2013.01); *H04L 63/20* (2013.01); *H04L 63/02* (2013.01)

(58) Field of Classification Search
CPC .......... H04L 63/02; H04L 63/14; G06F 21/62
USPC ............... 726/1, 11–14, 22–25; 713/187–188
See application file for complete search history.

(56) References Cited

U.S. PATENT DOCUMENTS

| | | | |
|---|---|---|---|
| 5,764,975 A * | 6/1998 | Taniguchi | ......... G06F 17/30539 |
| 6,826,698 B1 * | 11/2004 | Minkin | ............... H04L 63/0263 709/223 |
| 8,024,795 B2 | 9/2011 | Newton | |
| 8,065,721 B1 * | 11/2011 | Shah | ................... H04L 63/0209 726/13 |
| 8,516,585 B2 | 8/2013 | Cao et al. | |
| 8,539,577 B1 | 9/2013 | Stewart et al. | |
| 8,661,544 B2 | 2/2014 | Yen et al. | |
| 8,813,228 B2 | 8/2014 | Magee et al. | |
| 2003/0226038 A1 | 12/2003 | Raanan et al. | |
| 2006/0085838 A1 | 4/2006 | Samuelsson et al. | |

(Continued)

FOREIGN PATENT DOCUMENTS

WO  2014096761 A1  6/2014

OTHER PUBLICATIONS

Setnes, Magne, et al. "Similarity measures in fuzzy rule base simplification." Systems, Man, and Cybernetics, Part B: Cybernetics, IEEE Transactions on 28.3 (1998): 376-386.*

(Continued)

*Primary Examiner* — Madhuri Herzog
(74) *Attorney, Agent, or Firm* — Ryan, Mason & Lewis, LLP

(57) ABSTRACT

A processing device comprises a processor coupled to a memory and is configured to obtain at least one rule set utilized to detect malicious activity in a computer network, to determine one or more trigger conditions for each of a plurality of rules of the at least one rule set, to identify alerts generated responsive to the determined trigger conditions, to compute correlations between respective pairs of the plurality of rules based on the identified alerts, and to aggregate groups of two or more of the plurality of rules into respective aggregated rules based at least in part on the computed correlations. The aggregated rules are illustratively applied in conjunction with remaining unaggregated ones of the plurality of rules of the one or more rule sets to detect malicious activity in the computer network. The processing device may be implemented in a computer network or network security system.

20 Claims, 2 Drawing Sheets

(56) References Cited

U.S. PATENT DOCUMENTS

| | | | |
|---|---|---|---|
| 2008/0005795 A1* | 1/2008 | Acharya | H04L 63/0263 726/23 |
| 2008/0320549 A1* | 12/2008 | Bertino | G06F 21/604 726/1 |
| 2010/0017843 A1 | 1/2010 | Hilerio et al. | |
| 2010/0154026 A1 | 6/2010 | Chatterjee et al. | |
| 2010/0235915 A1 | 9/2010 | Memon et al. | |
| 2011/0208677 A1 | 8/2011 | Zhou et al. | |
| 2012/0096549 A1 | 4/2012 | Amini et al. | |

OTHER PUBLICATIONS

RSA Security Analytics, "Detect & Investigate Threats." Data Sheet, Oct. 2013, 6 pages.
D.E. Denning, "An Intrusion-Detection Model," IEEE Transactions on Software Engineering, Feb. 1987, pp. 222-232, vol. SE-13, No. 2.
P.B. Dhanke et al., "A Review Paper on Autonomous Network Security for Unsupervised Detection of Network Attacks," International Journal of Advanced Electronics & Communications Systems (IJAECS), Jun.-Jul. 2014, 4 pages, vol. 3, No. 3.
W. Lee et al., "Data Mining Approaches for Intrusion Detection," Proceedings of the 7th Conference on USENIX Security Symposium (SSYM), 1998, 24 pages, vol. 7.
V. Markam et al., "A General Study of Associations Rule Mining in Intrusion Detection System," International Journal of Emerging Technology and Advanced Engineering, Jan. 2012, pp. 347-356, vol. 2, No. 1.
P. Casas et al., "Steps Towards Autonomous Network Security: Unsupervised Detection of Network Attacks," 4th IFIP International Conference on New Technologies, Mobility and Security (NTMS), Feb. 2011, 6 pages, Paris, France.
F.S. Tsai, "Network Intrusion Detection Using Association Rules," International Journal of Recent Trends in Engineering, Nov. 2009, pp. 202-204, vol. 2, No. 2.
P. Casas et al., "Knowledge-Independent Traffic Monitoring: Unsupervised Detection of Network Attacks," IEEE Network: The Magazine of Global Internetworking, Jan. 2012, pp. 13-21, vol. 26, No. 1.
N.M. Varughese, "Collaborative Network Security Management System Based on Association Mining Rule," ICTACT Journal on Soft Computing: Special Issue on Soft Computing in System Analysis, Decision and Control, Jul. 2014, pp. 787-790, vol. 4, No. 4.
M. Nicolett et al., "Magic Quadrant for Security Information and Event Management," Gartner Research Note G00212454, May 2011, 32 pages.
R. Perdisci et al., "Detecting Malicious Flux Service Networks Through Passive Analysis of Recursive DNS Traces," Annual Computer Security Applications Conference (ACSAC), Dec. 2009, pp. 311-320.
R. Perdisci et al., "Early Detection of Malicious Flux Networks Via Large-Scale Passive DNS Traffic Analysis," IEEE Transactions on Dependable & Secure Computing, Sep. 2012, pp. 714-726, vol. 9, No. 5.
U.S. Appl. No. 12/982,288 filed in the name of J.P. Field et al. On Dec. 30, 2010 and entitled "Distributed Security Information and Event Management System With Application-Injected Remote Components."

* cited by examiner

UNSUPERVISED AGGREGATION OF SECURITY RULES

FIELD

The field relates generally to computer networks, and more particularly to techniques for detecting malicious activity in a computer network.

BACKGROUND

Computer networks are often configured to incorporate network security systems in order to protect the networks against malicious activity, such as deployment of malware or propagation of viruses by attackers. Network security systems typically rely on extensive sets of security rules in order to detect malicious activity. These rules in many cases are generated by domain experts and manually added into the system. Individual rules can be highly specific to detection of particular malicious activity scenarios. For example, some rules are configured to detect very specific binaries corresponding to particular sets of malicious code. Other rules include behavioral rules that are configured to detect anomalous or suspicious activities, such as an unusual amount of extracted data. Rules may overlap, contradict, contain or complete each other, or exhibit a wide variety of other types of relationships. Over time a given network security system can evolve to include hundreds or thousands of distinct security rules and maintaining such rules becomes a highly challenging and time-consuming task. In addition, as the rule sets become increasingly large and complex, application of the rules to detect malicious activity can undermine the performance of the network security system.

SUMMARY

Illustrative embodiments of the invention provide techniques for rule aggregation that advantageously avoid the above-noted drawbacks associated with maintaining and applying sets of rules in network security systems and other computer network contexts. Such techniques in some embodiments are fully automated or otherwise "unsupervised" in that manual processing of rule sets can be entirely avoided. Moreover, the techniques can help to limit the total number of rules in the rule sets, thereby preventing generation of unwieldy or unduly complex rule sets, and significantly improving performance in application of rule sets to detection of malicious activity in computer networks.

In one embodiment, a processing device comprises a processor coupled to a memory and is configured to obtain at least one rule set utilized to detect malicious activity in a computer network, to determine one or more trigger conditions for each of a plurality of rules of the at least one rule set, to identify alerts generated responsive to the determined trigger conditions, to compute correlations between respective pairs of the plurality of rules based on the identified alerts, and to aggregate groups of two or more of the plurality of rules into respective aggregated rules based at least in part on the computed correlations.

The aggregated rules are illustratively applied in conjunction with remaining unaggregated ones of the plurality of rules of the one or more rule sets to detect malicious activity in the computer network.

In addition, the above-noted operations of determining trigger conditions, identifying alerts, computing correlations and aggregating of groups of rules into respective aggregated rules can be repeated for each of one or more additional iterations in order to further reduce a total number of rules in the one or more rule sets.

A given such processing device configured with rule aggregation functionality may be implemented, for example, in one or more network devices of a computer network, or in a security analytics system or other type of network security system associated with the computer network.

Other embodiments include, without limitation, methods, apparatus, networks, systems and articles of manufacture comprising processor-readable storage media.

DETAILED DESCRIPTION

Illustrative embodiments of the present invention will be described herein with reference to exemplary computer networks and associated computers, servers, network devices or other types of processing devices. It is to be appreciated, however, that the invention is not restricted to use with the particular illustrative network and device configurations shown. Accordingly, the term "computer network" as used herein is intended to be broadly construed, so as to encompass, for example, any system comprising multiple networked processing devices.

Figure 1:
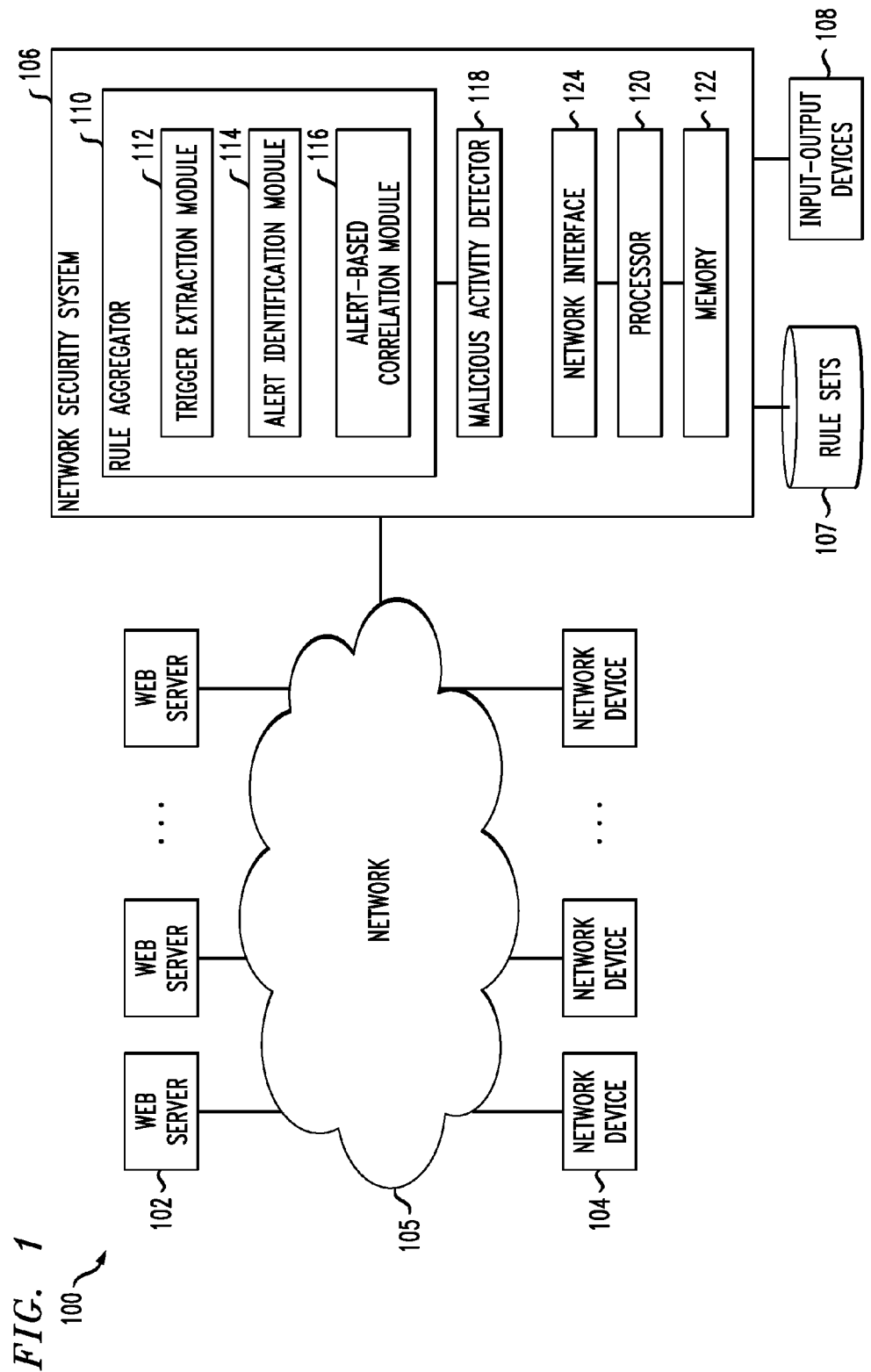
FIG. 1 shows a computer network configured with rule aggregation functionality in an illustrative embodiment of the invention.

FIG. 1 shows a computer network 100 configured in accordance with an illustrative embodiment of the invention. The computer network 100 comprises a plurality of web servers 102 and a plurality of additional network devices 104. The web servers 102 and additional network devices 104 communicate over a network 105. The additional network devices 104 may comprise, for example, client devices, network appliances or other types of network devices, in any combination. Such devices are examples of what are more generally referred to herein as "processing devices."

In one possible operating scenario, at least a subset of the web servers 102 and the additional network devices 104 comprise respective computers associated with a company, organization or other enterprise. Numerous other operating scenarios involving a wide variety of different types and arrangements of one or more processing devices are possible, as will be appreciated by those skilled in the art.

The network 105 is assumed to comprise a global computer network such as the Internet, although other types of networks can be part of the computer network 100, including a wide area network (WAN), a local area network (LAN), a satellite network, a telephone or cable network, a cellular network, a wireless network such as a WiFi or WiMAX network, or various portions or combinations of these and other types of networks. The computer network 100 in some embodiments therefore comprises combinations of multiple different types of networks each comprising network devices configured to communicate using Internet Protocol (IP) or other related communication protocols.

The computer network 100 further comprises a network security system 106 coupled to the network 105. The network security system 106 has associated storage devices 107 for storing rule sets. Such rule sets illustratively comprise respective sets of security rules utilized by the network security system 106 in detecting malicious activity in at least portions of the computer network 100, such as deployment of malware into one or more of the web servers 102 or additional network devices 104, or propagation of viruses into one or more of those devices, through a variety of different types of possible attacks. Other types of rules suitable for use in detecting malicious activity in a computer network can be used in other embodiments.

The storage devices 107 associated with the network security system 106 may comprise, for example, storage products such as VNX® and Symmetrix VMAX®, both commercially available from EMC Corporation of Hopkinton, Mass. A variety of other storage products may be utilized to implement at least a portion of the storage devices 107.

Also associated with the network security system 106 are input-output devices 108, which illustratively comprise keyboards, displays or other types of input-output devices in any combination. Such input-output devices are used to support one or more user interfaces to the network security system 106, as well as to support communication between the network security system 106 and other related systems and devices not explicitly shown.

The network security system 106 further comprises a rule aggregator 110. The rule aggregator 110 is configured to process rules of one or more of the rule sets stored in the storage devices 107 in order to aggregate at least some of those rules into aggregate rules, thereby reducing the total number of rules in the one or more rule sets.

The rule aggregator 110 in this embodiment comprises a trigger extraction module 112, an alert identification module 114 and an alert-based correlation module 116. It is to be appreciated that this particular arrangement of modules is exemplary only, and alternative arrangements can be used in other embodiments. For example, the functionality associated with the modules 112, 114 and 116 in other embodiments can be combined into a single module, or separated across a larger number of modules.

The rule aggregator 110 interacts with a malicious activity detector 118 which applies aggregated rules as well as other rules of one or more of the rule sets in detecting malicious activity in the computer network 100.

The network security system 106 in the FIG. 1 embodiment is assumed to be implemented using at least one processing device. Each such processing device generally comprises at least one processor and an associated memory, and implements one or more functional modules for controlling certain features of the network security system 106.

More particularly, the network security system 106 in this embodiment comprises a processor 120 coupled to a memory 122 and a network interface 124.

The processor 120 illustratively comprises a microprocessor, a microcontroller, an application-specific integrated circuit (ASIC), a field-programmable gate array (FPGA) or other type of processing circuitry, as well as portions or combinations of such circuitry elements.

The memory 122 illustratively comprises random access memory (RAM), read-only memory (ROM) or other types of memory, in any combination. The memory 122 and other memories disclosed herein may be viewed as examples of what are more generally referred to as "processor-readable storage media" storing executable computer program code or other types of software programs.

Articles of manufacture comprising such processor-readable storage media are considered embodiments of the present invention. A given such article of manufacture comprises, for example, a storage device such as a storage disk, a storage array or an integrated circuit containing memory. The term "article of manufacture" as used herein should be understood to exclude transitory, propagating signals.

The network interface 124 allows the network security system 106 to communicate over the network 105 with the web servers 102 and the other network devices 104, and comprises one or more conventional transceivers.

At least portions of the rule aggregator 110 of the network security system 106, such as portions of one or more of trigger extraction module 112, alert identification module 114 and alert-based correlation module 116, may be implemented at least in part in the form of software that is stored in memory 122 and executed by processor 120.

It is to be understood that the particular set of elements shown in FIG. 1 for providing rule aggregation in a computer network is presented by way of illustrative example only, and in other embodiments additional or alternative elements may be used. Thus, another embodiment may include additional or alternative systems, devices and other network entities, as well as different arrangements of modules and other components.

By way of example, in other embodiments, the network security system 106 can be eliminated and the rule aggregator 110 can be implemented elsewhere in the computer network 100, such as within one or more of the network devices 104.

In some embodiments, the network security system 106 is a part of or otherwise associated with another system, such as, for example, a security operations center (SOC) or a critical incident response center (CIRC).

Additionally or alternatively, the network security system 106 can be part of or incorporate an otherwise conventional security analytics system, such as the RSA Security Analytics system commercially available from RSA, The Security Division of EMC Corporation of Hopkinton, Mass.

Other embodiments can implement the network security system 106 and its associated rule aggregator 110 as part of or in conjunction with a security information and event management (SIEM), such as the enVision® platform, also commercially available from RSA. Additional details regarding SIEM systems can be found in, for example, U.S. patent application Ser. No. 12/982,288, filed Dec. 30, 2010 and entitled "Distributed Security Information and Event Management System with Application-Injected Remote Components," which is commonly assigned herewith and incorporated by reference herein.

An exemplary process utilizing rule aggregator 110 in computer network 100 will now be described in more detail with reference to the flow diagram of FIG. 2. It is to be understood that this particular process is exemplary only, and additional or alternative processes can be carried out in other embodiments.

In this embodiment, the exemplary process includes steps 200 through 210. Steps 200, 202, 204, 206 and 208 are assumed to be performed by the rule aggregator 110 in conjunction with processing one or more rule sets. Step 210 is assumed to be performed by malicious activity detector 118 using the one or more sets in conjunction with attempts to detect malicious activity in the computer network 100.

In step 200, at least one rule set utilized to detect malicious activity in the computer network 100 is obtained, possibly from the storage devices 107 or the memory 122. Alternatively, portions of a given rule set can be stored in the storage devices 107 with other portions being stored in the memory 122. The storage devices 107 and memory 122 can also store different rule sets, as in an arrangement in which a rule set is moved from the storage devices 107 into the memory 122 for processing by the rule aggregator 110 with the corresponding updated rule set comprising one or more aggregated rules being stored in the storage devices 107.

In step 202, one or more trigger conditions are determined for each of a plurality of rules of the rule set obtained in step 200. Each of the rules in the present embodiment is assumed to comprise one or more trigger conditions that if satisfied lead to generation of one or more alerts in the network security system. Accordingly, satisfaction of the trigger condition for a given rule causes that rule to "fire" or generate at least one alert, although other types of rules can be used in other embodiments. It should be noted in this regard that terms such as "trigger condition" and "alert" are intended to be broadly construed. For example, exemplary trigger conditions can illustratively comprise respective events that upon their occurrence cause the corresponding rules to fire. Also, exemplary alerts can include various actions that are taken automatically upon firing of a rule. It is therefore apparent that rule sets as processed herein can comprise a wide variety of different trigger conditions and alerts.

In step 204, alerts generated responsive to the trigger conditions determined in step 202 are identified.

In step 206, correlations are computed between respective pairs of the rules based on the alerts identified in step 204. In the present embodiment, this illustratively involves generating similarity measures for respective ones of the pairs of rules.

Assuming by way of example that a given one of the pairs of rules comprises a first rule denoted Rule A and a second rule denoted Rule B, one possible similarity measure for the given pair is generated in accordance with the equation:

$$S(A, B) = \frac{N_{A \cap B}}{N_{A \cup B}}$$

where S(A, B) is the similarity measure for the given pair comprising Rule A and Rule B, $N_{A \cap B}$ is the number of trigger conditions for which both Rule A and Rule B each generate one or more alerts, and $N_{A \cup B}$ is the number of trigger conditions for which either Rule A or Rule B generates one or more alerts. This is just one example of a similarity measure representing a computed correlation between a pair of rules. Numerous other types of similarity measures may be used.

For example, another type of similarity measure is generated in accordance with the equation:

$$S(A, B) = \frac{N_{A \cap B}}{N_A}$$

where S(A, B) is the similarity measure for the given pair comprising Rule A and Rule B, $N_{A \cap B}$ is the number of trigger conditions for which both Rule A and Rule B each generate one or more alerts, and $N_A$ is the number of trigger conditions for which Rule A generates one or more alerts.

The similarity measure in this example is an asymmetric similarity measure in that S(A, B)≠S(B, A). It may also be viewed as a type of association rules confidence measure generated based on extraction of an association rule of the form Rule A→Rule B from the pair of rules comprising Rule A and Rule B.

Another example of a similarity measure suitable for use in embodiments of the invention is generated in accordance with the equation:

$$S(A, B) = \frac{H(A) - H(A|B)}{H(A)}$$

where S(A, B) is the similarity measure for the given pair comprising Rule A and Rule B, H(A) is the information entropy of Rule A, and H(A|B) is the information entropy of Rule A given Rule B. The similarity measure in this example is a type of information gain based similarity measure, and it is to be appreciated that other types of information gain based measures can be used.

Yet another example of a similarity measure suitable for use in embodiments of the invention is generated in accordance with the equation:

$$S(A, B) = \frac{2N_A N_B}{N_A^2 + N_B^2}$$

where S(A, B) is the similarity measure for the given pair comprising Rule A and Rule B, $N_A$ is the number of trigger conditions for which Rule A generates one or more alerts, and $N_B$ is the number of trigger conditions for which Rule B generates one or more alerts. The similarity measure in this example is a type of statistical similarity measure, and more particularly a type of $F_1$-score with precision being given by $$\frac{N_A}{N_B}$$

and recall being given by $$\frac{N_A}{N_B}.$$

Again, the particular similarity measures described above are exemplary only, and alternative similarity measures or other types of alert-based correlations can be computed in other embodiments.

The similarity measures in the above examples are generated for respective pairs of the rules. This need not be all of the possible pairs of the rules in a given set of rules, but instead only a subset of those possible pairs. In addition, other alert-based correlations can be computed for more than two of the rules at a time.

In step 208, groups of two or more of the rules are aggregated into respective aggregated rules based at least in part on the similarity measures or other types of correlations computed in step 206.

In some embodiments of the present invention, the groups of rules are aggregated into respective aggregated rules by applying a clustering algorithm utilizing the computed correlations. For example, clustering algorithms such as hierarchical clustering, K-means clustering and density-based spatial clustering of applications with noise (DBSCAN) can be applied. Such algorithms are applied in embodiments of the present invention in order to aggregate rules with similar behavior as defined and extracted using the similarity measures or other correlation computations mentioned above.

Aggregating groups of two or more of the plurality of rules into respective aggregated rules in step 208 may be subject to various specified threshold aggregation conditions. For example, a given one of the groups of rules may be aggregated into an aggregated rule only if threshold aggregation conditions relating to at least one of a minimum number of alerts and a minimum percentage of alerts are satisfied by the computed correlations. Such an arrangement can be used to ensure a minimum level of confidence in the aggregation by indicating, for example, that the computed correlations apply to at least X alerts or to at least Y percent of the alerts, thereby avoiding correlations that are not statistically valid.

Other types of aggregation techniques can be applied in addition to or in place of aggregation based on clustering as described above. For example, if first and second rules in the set of rules have identical trigger conditions, those rules can be automatically aggregated into an aggregated rule. As another example, if a first one of the rules has as its one or more trigger conditions a subset of a plurality of trigger conditions of a second one of the rules, the first rule may be automatically incorporated into the second rule.

These and other possible aggregation techniques can include the following more detailed examples specified with reference to first and second rules denoted as Rule A and Rule B, respectively.

1. If when Rule A fires then Rule B always fires, and vice versa, then Rules A and B can be merged.

2. If when Rule A fires then Rule B almost always fires, and vice versa, then Rules A and B can be "fuzzy" merged, in that the two rules are sufficiently highly correlated but do not have identical trigger conditions.

3. If when Rule A fires then Rule B always fires, but not vice versa, then Rule A is considered to be contained within Rule B.

Again, these are only examples of possible aggregation techniques, and numerous other types of aggregation may be used. It should be noted in this regard that terms such as "aggregate" and "aggregated" as used herein are intended to be broadly construed, so as to encompass a wide variety of techniques for merging, pruning, combining or otherwise maintaining rules within one or more sets of rules.

As mentioned previously, rules aggregation in the present embodiment can be based at least in part on extraction of association rules from the rule set. For example, computing correlations between respective pairs of rules based on identified alerts may comprise extracting association rules of the form Rule A→Rule B where Rule A and Rule B denote respective first and second rules of a given one of the pairs of rules, and determining significance measures for respective ones of the association rules. Such significance measures can include the exemplary association rules confidence measure described previously. Other types of significance measures that can be used include, for example, support measures and lift measures. Also, combinations of multiple significance measures such as confidence, support and lift can be used to control aggregation of the corresponding rules.

In one possible arrangement of this type, aggregating groups of two or more of the rules into respective aggregated rules based at least in part on the computed correlations illustratively comprises comparing the significance measure for a given one of the association rules to a threshold, and aggregating the pair of rules of the association rule into an aggregated rule if the significance measure exceeds the threshold.

Numerous other techniques can be used to perform rule aggregation utilizing alert-based correlations computed in the manner described above.

The rules aggregation in the present embodiment advantageously provides a data-driven approach to reducing the total number of rules in one or more rule sets.

The above-described steps 202 through 208 comprising determining trigger conditions, identifying alerts, computing correlations and aggregating of groups of rules into respective aggregated rules can be repeated for each of one or more additional iterations in order to further reduce a total number of rules in the one or more rule sets. Aggregated rules generated in one iteration can be subject to further aggregation with other aggregated or unaggregated rules in a subsequent iteration.

In step 210, the aggregated rules are applied in conjunction with remaining unaggregated rules of the one or more rule sets to detect malicious activity in the computer network 100.

Figure 2:
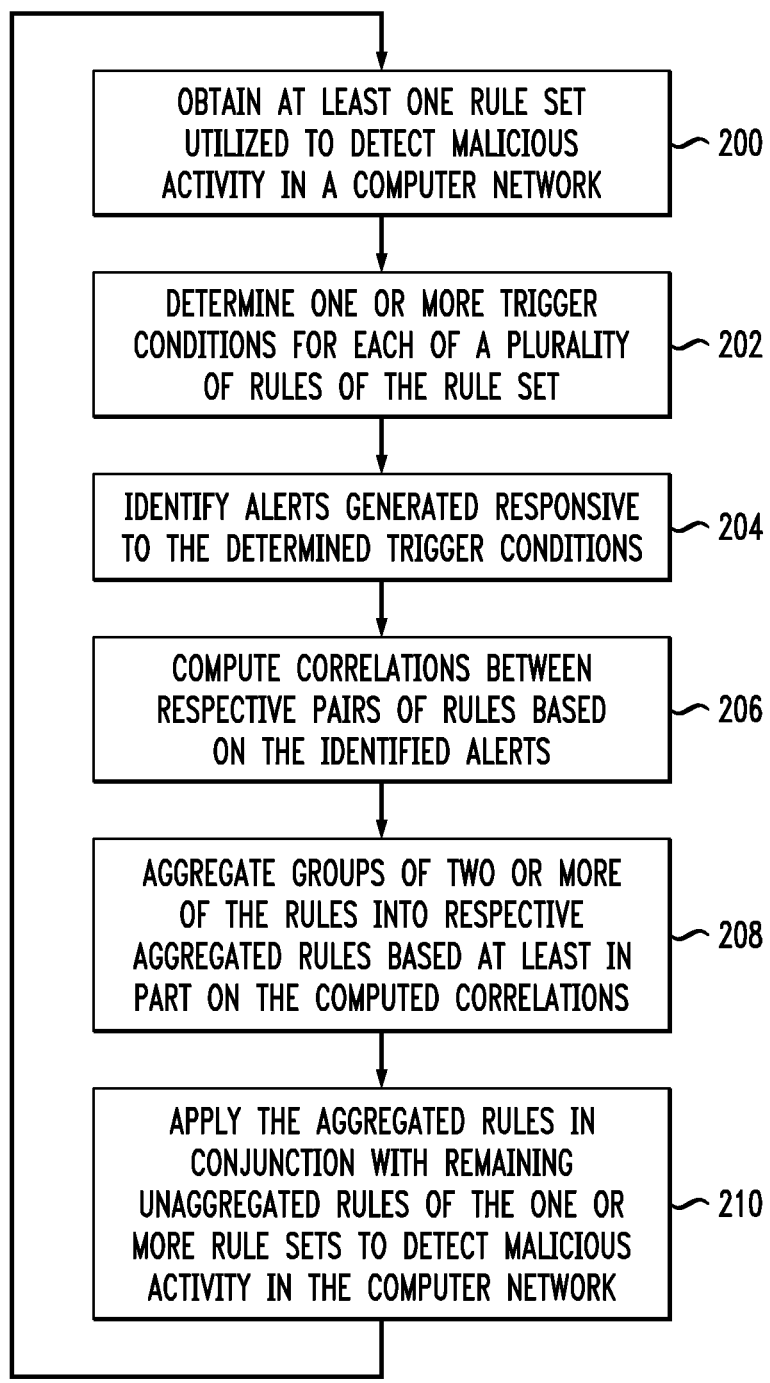
FIG. 2 is a flow diagram of an exemplary process for rule aggregation in the computer network of FIG. 1.

The particular processing operations and other network functionality described in conjunction with the flow diagram of FIG. 2 are presented by way of illustrative example only, and should not be construed as limiting the scope of the invention in any way. Alternative embodiments can use other types of processing operations to implement rule aggregation for a computer network. For example, the ordering of the process steps may be varied in other embodiments, or certain steps may be performed concurrently with one another rather than serially. Also, as noted above, at least a subset of the process steps may be repeated periodically in conjunction with respective distinct rule aggregation instances, possibly applied to different ones of the rule sets stored in the storage devices 107.

Illustrative embodiments of the invention advantageously provide techniques for automatically processing potentially large and complex rule sets in a manner that significantly reduces the total number of rules in each set. This considerably facilitates maintenance and application of sets of rules in network security systems and other computer network contexts. The techniques in some embodiments are fully automated or otherwise "unsupervised" in that manual processing of rule sets can be entirely avoided. Moreover, the techniques can help to limit the total number of rules in the rule sets, thereby preventing generation of unwieldy or unduly complex rule sets, and significantly improving performance in application of rule sets to detection of malicious activity in computer networks.

It should again be emphasized that the above-described embodiments of the invention are presented for purposes of illustration only. Many variations may be made in the particular arrangements shown. For example, although described in the context of particular network and device configurations, the techniques are applicable to a wide variety of other types of computer networks and processing device configurations. Also, different types and arrangements of rule sets, rules, trigger conditions, alerts, correlation computations, similarity measures, rule aggregations and other features may be used in other embodiments. Moreover, the assumptions made herein in the context of describing some illustrative embodiments should not be construed as limitations or requirements of the invention, and need not apply in other embodiments. Numerous other alternative embodiments within the scope of the appended claims will be readily apparent to those skilled in the art.

What is claimed is:

1. A method comprising steps of:
obtaining at least one rule set utilized to detect malicious activity in a computer network;
determining one or more trigger conditions for each of a plurality of rules of said at least one rule set;
identifying alerts generated responsive to the determined trigger conditions;
computing correlations between respective pairs of the plurality of rules based on the identified alerts as a function of numbers of trigger conditions for which respective first and second rules of a given one of the pairs of rules generate one or more alerts;
aggregating groups of two or more of the plurality of rules into respective aggregated rules based at least in part on the computed correlations; and
applying the aggregated rules in conjunction with remaining unaggregated ones of the plurality of rules of the one or more rule sets to detect malicious activity in the computer network;
wherein the steps are performed by at least one processing device comprising a processor coupled to a memory.

2. The method of claim 1 wherein computing correlations between respective pairs of the plurality of rules comprises generating similarity measures for respective ones of the pairs of rules.

3. The method of claim 2 wherein a given one of the pairs of rules comprises a first rule denoted Rule A and a second rule denoted Rule B and the similarity measure for the given pair is generated in accordance with the equation:

$$S(A, B) = \frac{N_{A \cap B}}{N_{A \cup B}}$$

where $S(A, B)$ is the similarity measure for the given pair comprising Rule A and Rule B, $N_{A \cap B}$ is the number of trigger conditions for which both Rule A and Rule B each generate one or more alerts, and $N_{A \cup B}$ is the number of trigger conditions for which either Rule A or Rule B generates one or more alerts.

4. The method of claim 2 wherein a given one of the pairs of rules comprises a first rule denoted Rule A and a second rule denoted Rule B and the similarity measure for the given pair is generated in accordance with the equation:

$$S(A, B) = \frac{N_{A \cap B}}{N_A}$$

where $S(A, B)$ is the similarity measure for the given pair comprising Rule A and Rule B, $N_{A \cap B}$ is the number of trigger conditions for which both Rule A and Rule B each generate one or more alerts, and $N_A$ is the number of trigger conditions for which Rule A generates one or more alerts.

5. A method comprising steps of:
obtaining at least one rule set utilized to detect malicious activity in a computer network;
determining one or more trigger conditions for each of a plurality of rules of said at least one rule set;
identifying alerts generated responsive to the determined trigger conditions;
computing correlations between respective pairs of the plurality of rules based on the identified alerts;
aggregating groups of two or more of the plurality of rules into respective aggregated rules based at least in part on the computed correlations; and
applying the aggregated rules in conjunction with remaining unaggregated ones of the plurality of rules of the one or more rule sets to detect malicious activity in the computer network;
wherein computing correlations between respective pairs of the plurality of rules comprises generating similarity measures for respective ones of the pairs of rules;
wherein a given one of the pairs of rules comprises a first rule denoted Rule A and a second rule denoted Rule B and the similarity measure for the given pair is generated in accordance with the equation:

$$S(A, B) = \frac{H(A) - H(A|B)}{H(A)}$$

where $S(A, B)$ is the similarity measure for the given pair comprising Rule A and Rule B, $H(A)$ is the information entropy of Rule A, and $H(A|B)$ is the information entropy of Rule A given Rule B; and
wherein the steps are performed by at least one processing device comprising a processor coupled to a memory.

6. The method of claim 2 wherein a given one of the pairs of rules comprises a first rule denoted Rule A and a second rule denoted Rule B and the similarity measure for the given pair is generated in accordance with the equation:

$$S(A, B) = \frac{2 N_A N_B}{N_A^2 + N_B^2}$$

where $S(A, B)$ is the similarity measure for the given pair comprising Rule A and Rule B, $N_A$ is the number of trigger conditions for which Rule A generates one or more alerts, and $N_B$ is the number of trigger conditions for which Rule B generates one or more alerts.

7. The method of claim 1 wherein aggregating groups of two or more of the plurality of rules into respective aggregated rules based at least in part on the computed correlations comprises applying a clustering algorithm utilizing the computed correlations.

8. The method of claim 7 wherein the clustering algorithm comprises one or more of hierarchical clustering, K-means clustering and DBSCAN clustering.

9. The method of claim 1 wherein computing correlations between respective pairs of the plurality of rules based on the identified alerts comprises:
extracting association rules of the form Rule A→Rule B where Rule A and Rule B denote respective first and second rules of a given one of the pairs of rules; and
determining significance measures for respective ones of the association rules.

10. The method of claim 9 wherein determining significance measures for respective ones of the association rules comprises determining at least one of a confidence measure, a support measure and a lift measure for each of one or more of the association rules.

11. The method of claim 9 wherein aggregating groups of two or more of the plurality of rules into respective aggregated rules based at least in part on the computed correlations comprises:
comparing the significance measure for a given one of the association rules to a threshold; and
aggregating the pair of rules of the association rule into an aggregated rule if the significance measure exceeds the threshold.

12. The method of claim 1 wherein aggregating groups of two or more of the plurality of rules into respective aggregated rules based at least in part on the computed correlations comprises aggregating a given one of the groups into an aggregated rule only if one or more threshold aggregation conditions relating to at least one of a minimum number of alerts and a minimum percentage of alerts are satisfied by the computed correlations.

13. The method of claim 1 further comprising at least one of:
if first and second rules of the plurality of rules have identical trigger conditions, automatically aggregating the first and second rules into an aggregated rule; and
if a first one of the plurality of rules has as its one or more trigger conditions a subset of a plurality of trigger conditions of a second one of the plurality of rules, automatically incorporating the first rule into the second rule.

14. The method of claim 1 further comprising repeating the determining, identifying, computing and aggregating steps for each of one or more additional iterations in order to further reduce a total number of rules in the one or more rule sets.

15. An article of manufacture comprising a processor-readable storage medium having stored therein program code of one or more software programs, wherein the program code when executed by at least one processing device causes said at least one processing device:
- to obtain at least one rule set utilized to detect malicious activity in a computer network;
- to determine one or more trigger conditions for each of a plurality of rules of said at least one rule set;
- to identify alerts generated responsive to the determined trigger conditions;
- to compute correlations between respective pairs of the plurality of rules based on the identified alerts as a function of numbers of trigger conditions for which respective first and second rules of a given one of the pairs of rules generate one or more alerts;
- to aggregate groups of two or more of the plurality of rules into respective aggregated rules based at least in part on the computed correlations; and
- to apply the aggregated rules in conjunction with remaining unaggregated ones of the plurality of rules of the one or more rule sets to detect malicious activity in the computer network.

16. An apparatus comprising:
- at least one processing device comprising a processor coupled to a memory;
- said at least one processing device being configured:
- to obtain at least one rule set utilized to detect malicious activity in a computer network;
- to determine one or more trigger conditions for each of a plurality of rules of said at least one rule set;
- to identify alerts generated responsive to the determined trigger conditions;
- to compute correlations between respective pairs of the plurality of rules based on the identified alerts as a function of numbers of trigger conditions for which respective first and second rules of a given one of the pairs of rules generate one or more alerts;
- to aggregate groups of two or more of the plurality of rules into respective aggregated rules based at least in part on the computed correlations; and
- to apply the aggregated rules in conjunction with remaining unaggregated ones of the plurality of rules of the one or more rule sets to detect malicious activity in the computer network.

17. The apparatus of claim 16 wherein the apparatus comprises:
- a rule aggregator; and
- a malicious activity detector coupled to the rule aggregator;
- wherein the rule aggregator is configured to generate the aggregated rules based at least in part on the computed correlations;
- wherein the malicious activity detector is configured to apply the aggregated rules in conjunction with remaining unaggregated ones of the plurality of rules of the one or more rule sets to detect malicious activity in the computer network; and
- wherein the rule aggregator comprises an alert-based correlation module configured to compute the correlations between respective pairs of the plurality of rules based on the identified alerts.

18. The apparatus of claim 16 further comprising a computer network that incorporates said at least one processing device.

19. The apparatus of claim 16 further comprising a network security system that incorporates said at least one processing device.

20. The method of claim 1 wherein computing correlations between respective pairs of the plurality of rules based on the identified alerts comprises computing a corresponding one of the correlations as a function of two or more of the following for the given one of the pairs of rules:
(i) number of trigger conditions for which the first one of the rules of the given pair generates one or more alerts;
(ii) number of trigger conditions for which the second one of the rules of the given pair generates one or more alerts;
(iii) number of trigger conditions for which both the first and second rules of the given pair generate one or more alerts; and
(iv) number of trigger conditions for which either the first rule or the second rule generates one or more alerts.

* * * * *